United States Patent
Adams et al.

(10) Patent No.: US 9,148,448 B2
(45) Date of Patent: *Sep. 29, 2015

(54) SYSTEM AND METHOD FOR CONFIGURING DEVICES FOR SECURE OPERATIONS

(71) Applicant: BlackBerry Limited, Waterloo (CA)

(72) Inventors: Neil Patrick Adams, Waterloo (CA); Herbert Anthony Little, Waterloo (CA); Michael Stephen Brown, Kitchener (CA); Ian Robertson, Waterloo (CA); Michael Grant Kirkup, Waterloo (CA); Michael Kenneth Brown, Fergus (CA); David Victor MacFarlane, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/891,350

(22) Filed: May 10, 2013

(65) Prior Publication Data
US 2013/0247143 A1 Sep. 19, 2013

Related U.S. Application Data

(63) Continuation of application No. 13/182,827, filed on Jul. 14, 2011, now Pat. No. 8,442,489, which is a continuation of application No. 11/065,901, filed on Feb. 25, 2005, now Pat. No. 8,010,989.

(60) Provisional application No. 60/567,137, filed on Apr. 30, 2004.

(51) Int. Cl.
*H04L 29/06* (2006.01)
*H04W 12/08* (2009.01)
*H04L 12/24* (2006.01)

(52) U.S. Cl.
CPC .............. *H04L 63/20* (2013.01); *H04L 63/102* (2013.01); *H04L 63/105* (2013.01); *H04W 12/08* (2013.01); *H04L 41/0806* (2013.01)

(58) Field of Classification Search
CPC .. G06F 21/74; H04L 41/0806; H04L 63/0471
USPC ............................................................ 726/1
See application file for complete search history.

(56) References Cited

U.S. PATENT DOCUMENTS

| | | | |
|---|---|---|---|
| 5,935,248 | A | 8/1999 | Kuroda |
| 6,202,157 | B1 | 3/2001 | Brownlie et al. |

(Continued)

FOREIGN PATENT DOCUMENTS

WO       0069120       11/2000

OTHER PUBLICATIONS

International Search Report and Written Opinion for Application No. PCT/CA2005/000294; mailed Jun. 20, 2005; 11 pages.

(Continued)

*Primary Examiner* — Hadi Armouche
*Assistant Examiner* — Bryan Wright
(74) *Attorney, Agent, or Firm* — Conley Rose, P.C.; J. Robert Brown, Jr.

(57) ABSTRACT

Systems and methods for establishing a security-related mode of operation for computing devices. A policy data store contains security mode configuration data related to the computing devices. Security mode configuration data is used in establishing a security-related mode of operation for the computing devices.

20 Claims, 10 Drawing Sheets

(56) References Cited

U.S. PATENT DOCUMENTS

| | | | |
|---|---|---|---|
| 6,360,321 B1* | 3/2002 | Gressel et al. | 713/172 |
| 6,490,680 B1 | 12/2002 | Scheidt et al. | |
| 6,732,168 B1 | 5/2004 | Bearden et al. | |
| 6,748,195 B1* | 6/2004 | Phillips | 455/41.2 |
| 6,775,536 B1 | 8/2004 | Geiger et al. | |
| 7,131,003 B2 | 10/2006 | Lord et al. | |
| 7,317,699 B2 | 1/2008 | Godfrey et al. | |
| 7,591,002 B2 | 9/2009 | Shelest et al. | |
| 8,010,989 B2* | 8/2011 | Adams et al. | 726/1 |
| 8,131,281 B1* | 3/2012 | Hildner et al. | 455/418 |
| 8,442,489 B2* | 5/2013 | Adams et al. | 455/410 |
| 2002/0165912 A1 | 11/2002 | Wenocur et al. | |
| 2002/0186845 A1 | 12/2002 | Dutta et al. | |
| 2003/0100291 A1* | 5/2003 | Krishnarajah et al. | 455/410 |
| 2003/0204722 A1 | 10/2003 | Schoen et al. | |
| 2004/0019789 A1* | 1/2004 | Buer | 713/170 |
| 2004/0019807 A1 | 1/2004 | Freund | |
| 2004/0123118 A1 | 6/2004 | Dahan et al. | |
| 2004/0143750 A1* | 7/2004 | Kulack et al. | 713/200 |
| 2005/0036622 A1* | 2/2005 | Hay et al. | 380/270 |
| 2005/0183138 A1 | 8/2005 | Phillips et al. | |
| 2005/0190764 A1 | 9/2005 | Shell et al. | |
| 2005/0197099 A1 | 9/2005 | Nehushtan | |
| 2005/0240995 A1* | 10/2005 | Ali et al. | 726/16 |
| 2006/0105740 A1* | 5/2006 | Puranik | 455/410 |
| 2010/0002879 A1* | 1/2010 | Risley | 380/255 |
| 2010/0100964 A1* | 4/2010 | Mahaffey et al. | 726/25 |

OTHER PUBLICATIONS

Jansen et al.; "Assigning and Enforcing Security Policies on Handheld Devices," Canadian Information Technology Security Symposium, May 17, 2002, 8 pages.

M. Sems; "Verifying Indentity in a Digital World;" Systems & Processes; Aug. 2000; vol. 4, Issue 3; pp. 126-131.

Supplementary European Search Report; Issued Jul. 11, 2007 by European Patent Office, for European Patent Application No. 05714536.

* cited by examiner

SYSTEM AND METHOD FOR CONFIGURING DEVICES FOR SECURE OPERATIONS

CROSS-REFERENCE TO RELATED APPLICATIONS

This application is a continuation of U.S. patent application Ser. No. 13/182,827, filed Jul. 14, 2011, entitled "System and Method for Configuring Devices for Secure Operations," which is a continuation of U.S. patent application Ser. No. 11/065,901, filed Feb. 25, 2005, entitled "System and Method for Configuring Devices for Secure Operations," which claims priority to and the benefit of U.S. Provisional Patent Application 60/567,137, filed Apr. 30, 2004, entitled "System and Method for Configuring Devices for Secure Operations," the entirety of each being incorporated herein by reference.

BACKGROUND

The present invention relates generally to the field of communications, and in particular to configuring devices for secure operations.

Mobile wireless communications devices are increasingly being used within corporate and governmental organizations. With the increased usage of mobile devices, companies are faced with the issue of defining and enforcing a secure mode of operation for their deployed devices that they consider secure and in accordance with their corporate or government security policy.

For example, when government agencies purchase and deploy a product that has been validated to FIPS 140-2 ("Security Requirements for Cryptographic Modules") the product is only authorized for use by employees when it operates in a secure mode of operation referred to as the FIPS mode of operation. With the many different security settings that are potentially configurable, the task of defining and configuring a secure mode of operation on an individual IT policy basis for multiple devices is difficult. Also, once a device is configured into a secure mode, the device operator does not have an efficient way to know that the device has been so configured.

DETAILED DESCRIPTION

In accordance with the teachings disclosed herein, systems and methods are provided for establishing security-related modes of operation for computing devices. As an example of a system and method, a policy data store contains security mode configuration data related to the computing devices. Security mode configuration data is used in establishing a security-related mode of operation for the computing devices.

As another example, a computing device can be configured to utilize a centralized policy data store to implement a security-related mode of operation. The computing device includes a communication interface and a system processor. The communication interface facilitates communication between a centralized policy data store and the computing device. Processing instructions that operate on the computing device include security instructions that place the computing device in a secure mode of operation responsive to configuration data received from the centralized policy data store via the communication interface. The system processor instructions can also include user interface instructions for sending a notification to a display associated with the computing device. The output can include a visual indication of the security mode of operation.

As will be appreciated, the systems and methods disclosed herein are capable of different embodiments, and its details are capable of modifications in various respects. Accordingly, the drawings and description set forth below are to be regarded as illustrative in nature and not restrictive.

Figure 1:
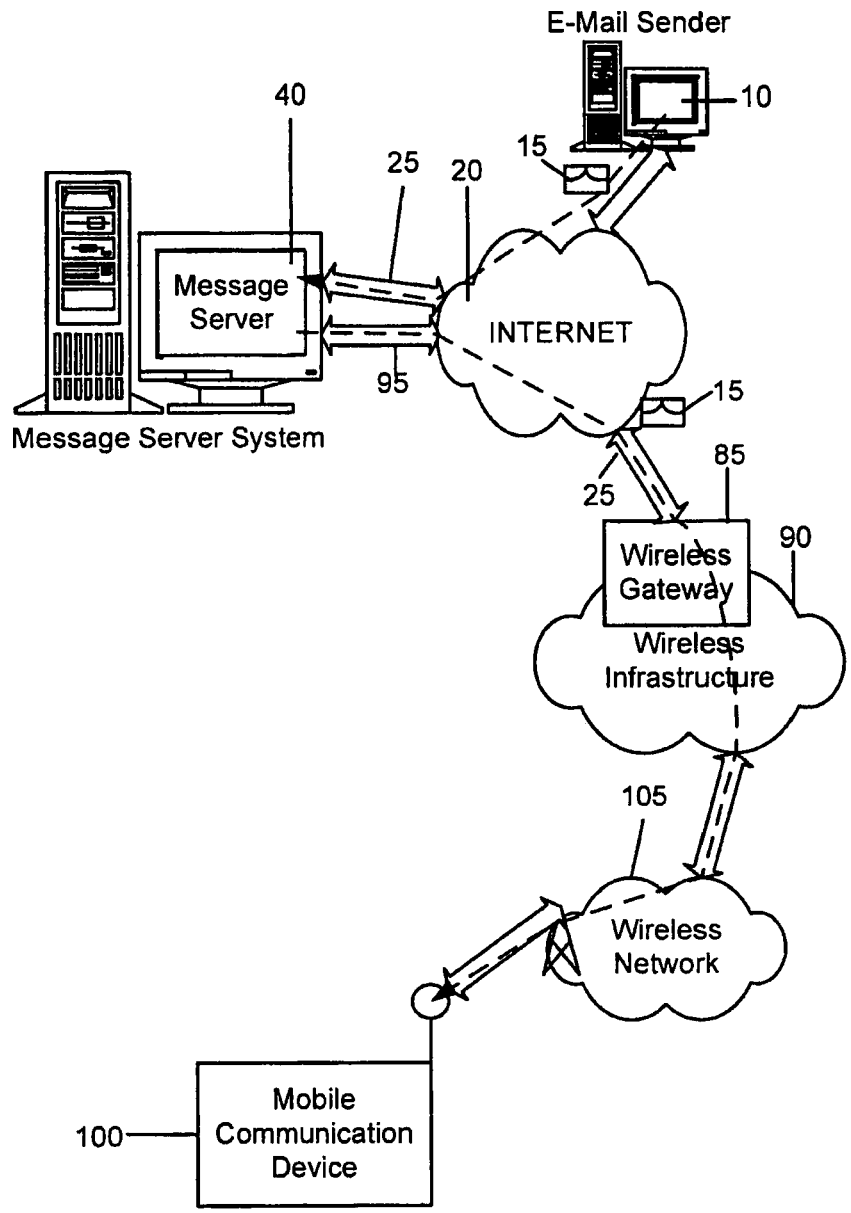
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange.™. and Lotus Domino.™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Figure 2:
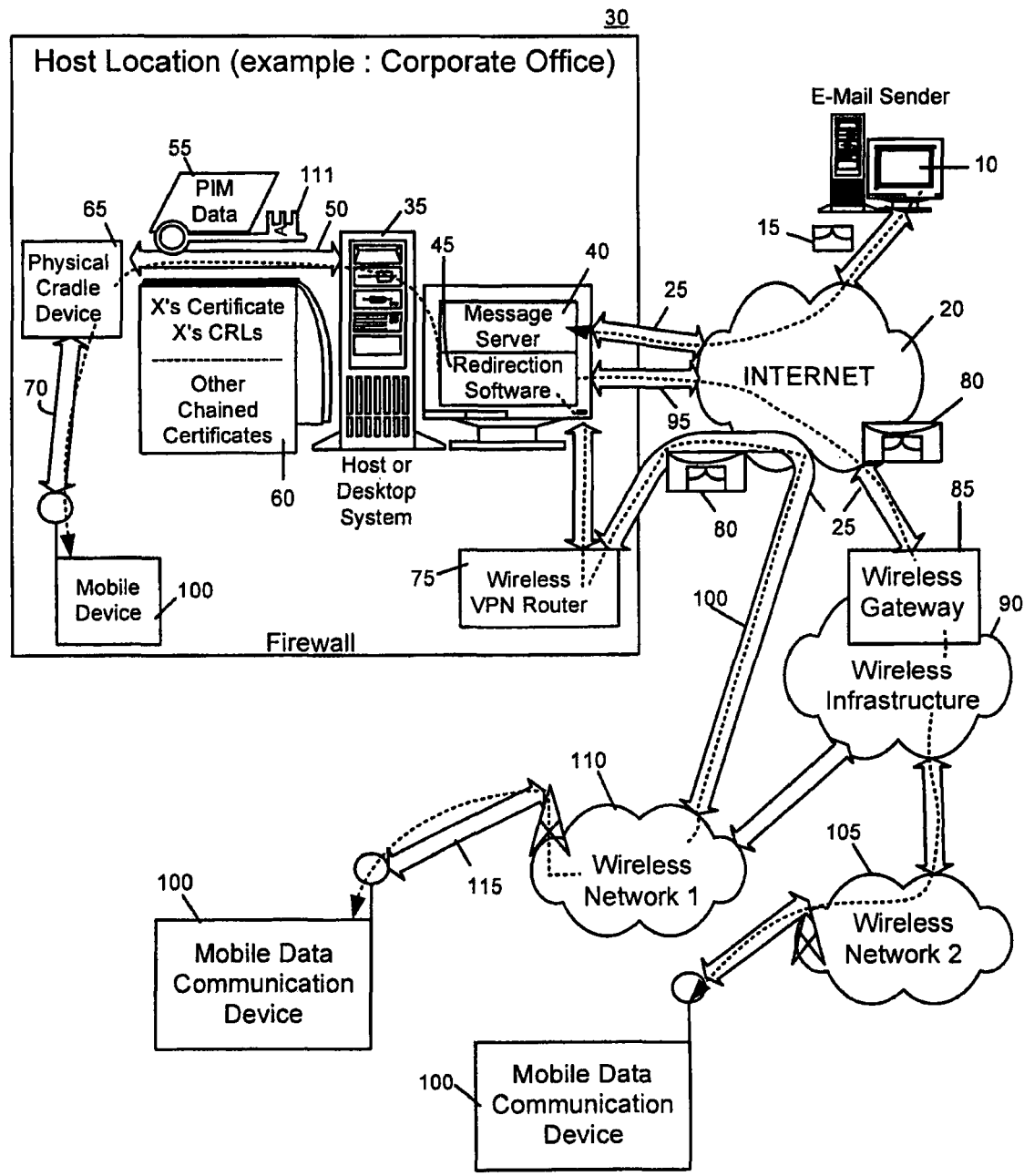
FIG. 2 is a block diagram of a further example communication system including multiple networks and multiple mobile communication devices.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex.™. Radio Network and the DataTAC.™. Radio Network. Examples of older voice-centric data networks include Personal Communication Systems (PCS) networks like GSM, and TDMA systems FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
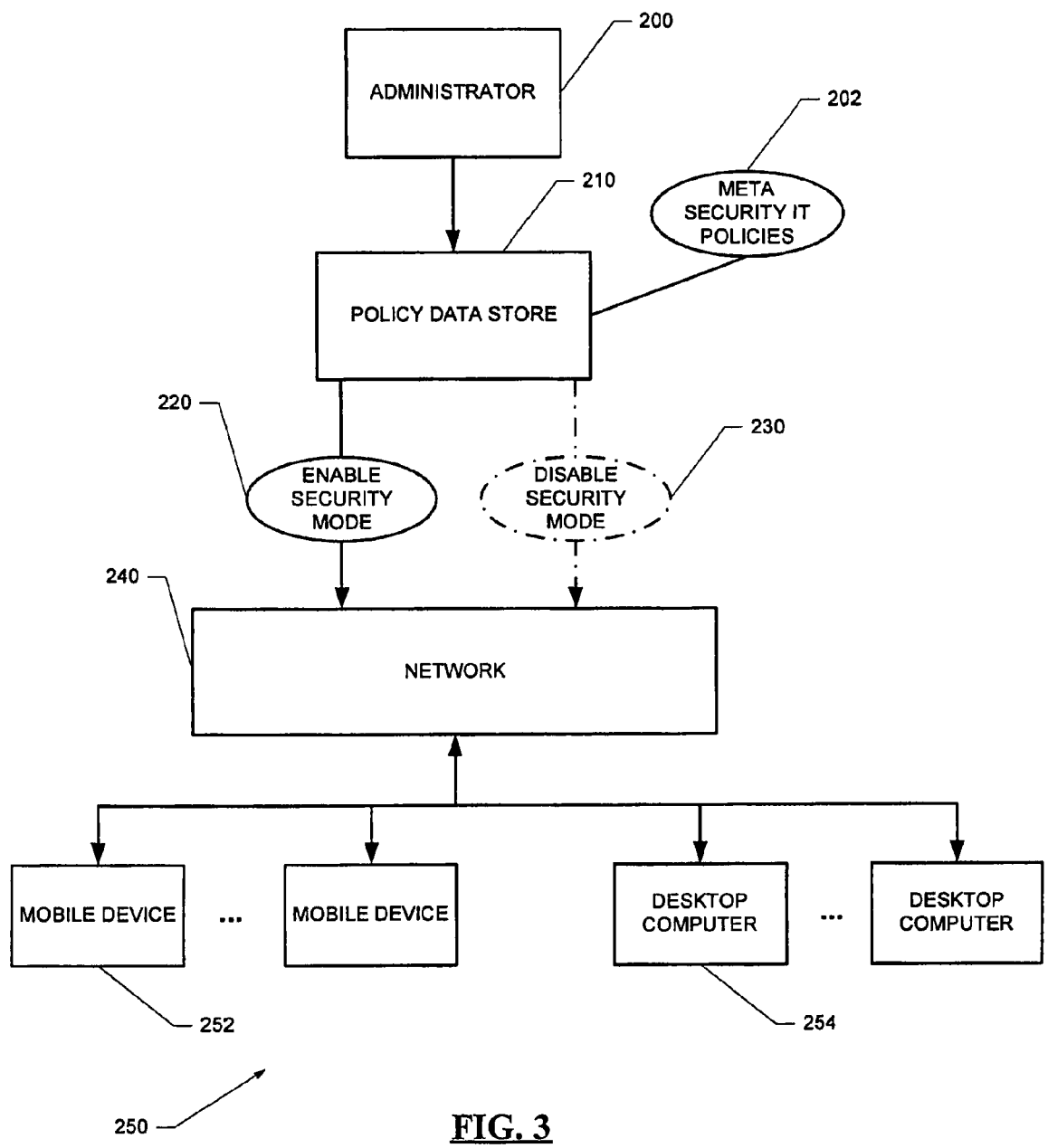
FIG. 3 is a block diagram depicting a system wherein an IT (information technology) administrator can collect and store IT security policies.

FIG. 3 depicts a system wherein an IT (information technology) administrator 200 can collect all applicable IT security policies 202 into one convenient location (e.g., policy data store 210). The placement of IT policies 202 in one location 210 allows an administrator 200 to configure the policies 202 appropriately, and to enable (220) or disable (230) a secure mode defined therein for the devices 250.

Mode instructions (e.g., commands 220 and 230) may be sent to the devices 250 over many different types of data communication links, such as a network 240. Different devices may be connected to the network 240, including mobile devices (e.g., mobile wireless communications device 252) and desktop/laptop computers (e.g., desktop computer 254).

Figure 4:
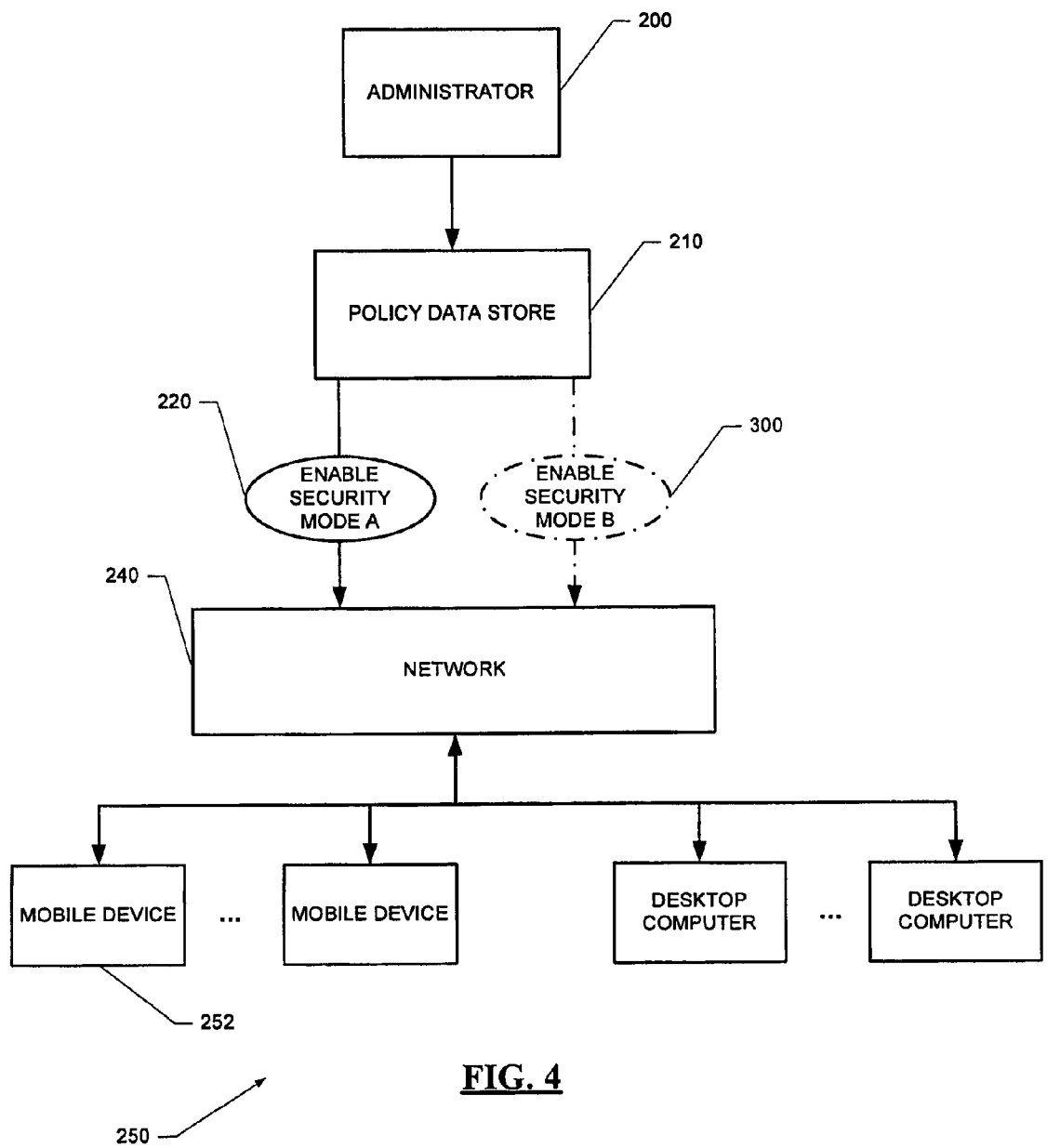
FIG. 4 is a block diagram depicting different security mode instructions being provided to devices.

As shown in FIG. 4, the devices 250 can be instructed to be in a first secure mode of operation, and then later they can be switched to a different secure mode of operation. For example, an administrator 200 may send a security mode A enable command 220. Later because of a change in IT security policy, the administrator 200 wishes to raise the security level of the mode in which the devices 250 are operating and therefore sends a security mode B enable command 300 to the devices 250.

Figure 5:
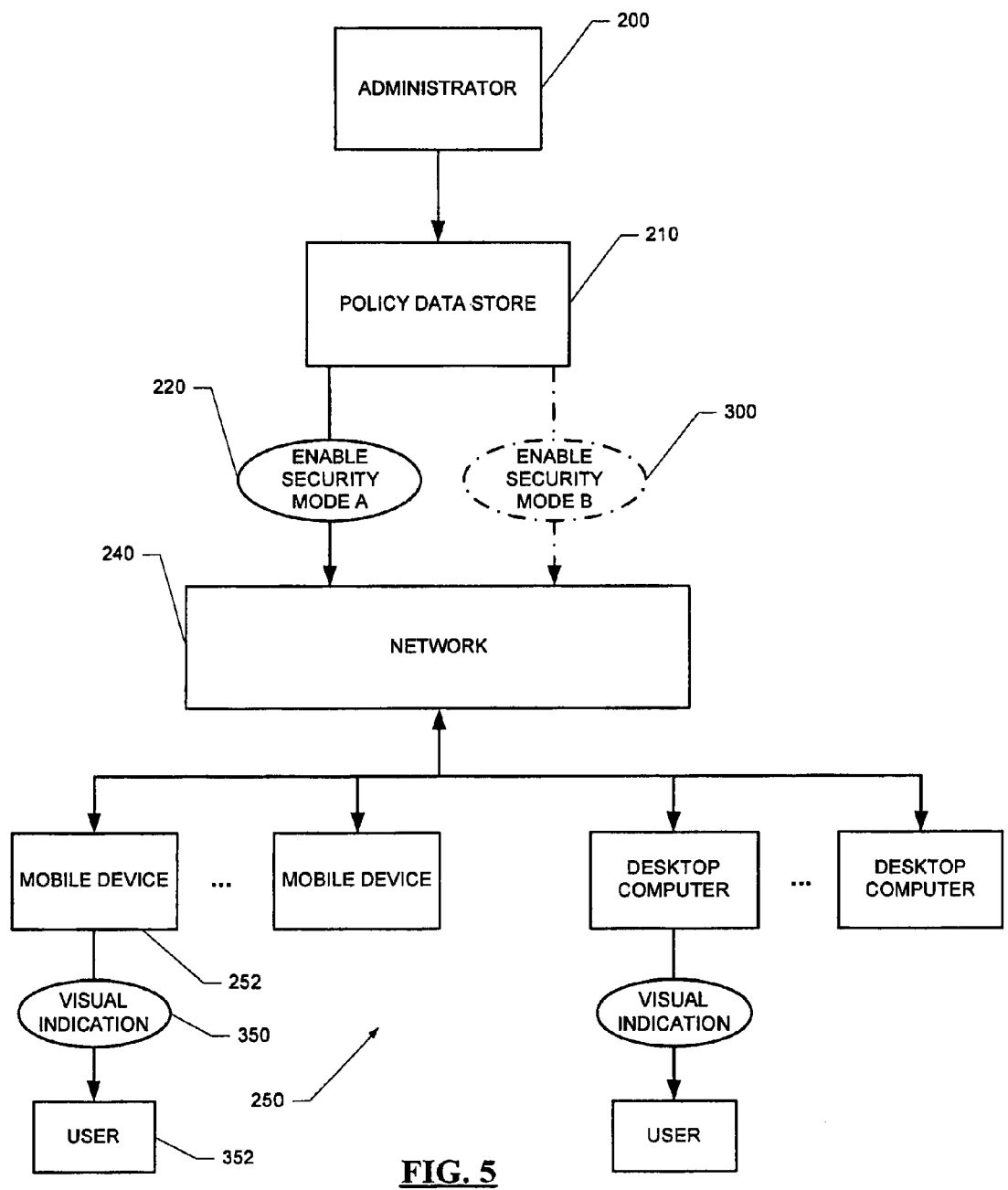
FIG. 5 is a block diagram depicting the generation of visual indicators for display to users that indicate the devices' secure mode of operation type.

FIG. 5 illustrates that the devices 250 can provide some type of an indication to the users of the devices. The indication can be a visual indication 350 which is provided to a user 352. The visual indication 350 indicates to the user 352 that the device 252 is operating in a specific secure mode. For example, it can display in a security options screen that the device 252 is operating in a FIPS mode of operation due to the security configuration sent by the administrator 200.

Figure 6:
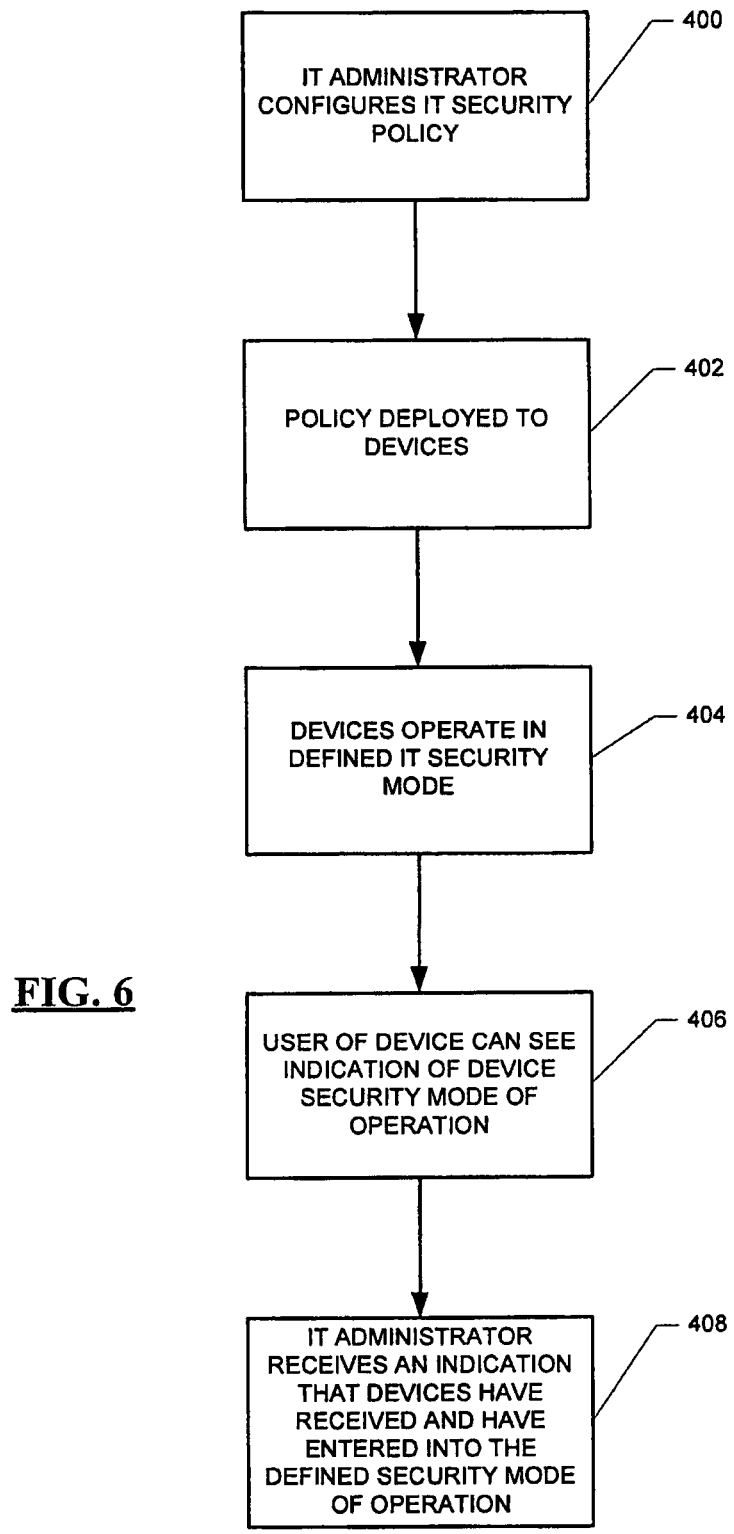
FIG. 6 is a flowchart depicting an operational scenario wherein a security policy is deployed to multiple devices.

FIG. 6 depicts an operational scenario wherein a security policy is deployed to multiple devices. At step 400, an IT administrator (or its agent) configures a security policy and deploys it to the devices at step 402. In this operational scenario, an IT administrator can designate and deploy a security mode to multiple devices with minimal effort on the part of the IT administrator. As an illustration, an IT administrator can click an administrator's interface checkbox to designate that all (or most) of the devices should be uniformly operating at security level three.

At step 404, the devices receive the deployed security mode and process the mode command. Processing of the command causes the devices to operate in the defined security mode. At step 406, a user of the device can see an indication of which specific security mode the device has been configured by the IT administrator. At step 408, the IT administrator receives an indication from the devices that the devices have received and entered into the designated secure mode of operation.

It should be understood that similar to the other processing flows described herein, the steps and the order of the steps in the flowchart described herein may be altered, modified and/or augmented and still achieve the desired outcome.

Figure 7:
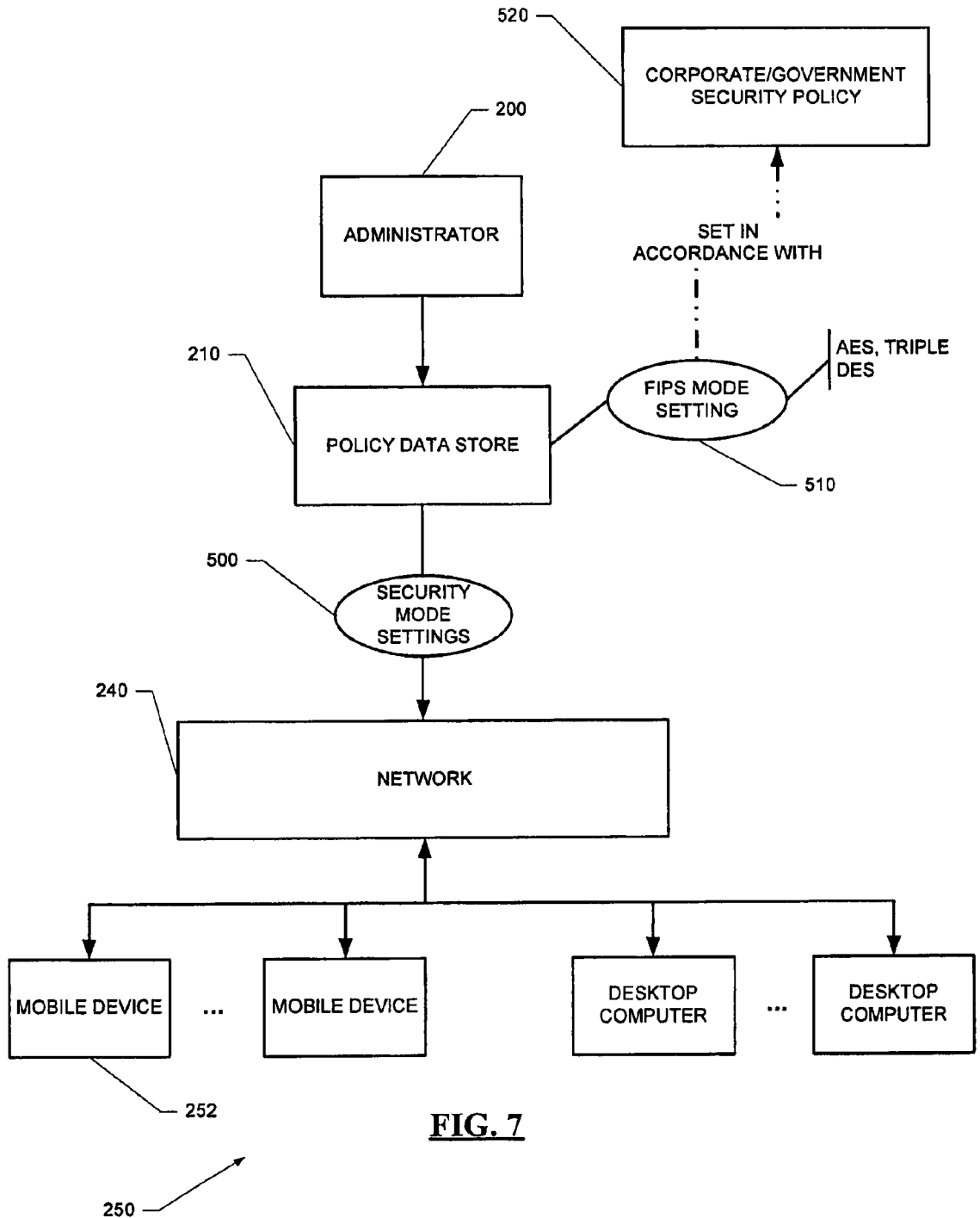
FIG. 7 is a block diagram depicting the deployment of a FIPS mode of operation.

FIG. 7 depicts a system wherein an IT administrator 200 can define a meta IT policy for a FIPS mode of operation 510. The parameters for the FIPS mode of operation 510 are set in accordance with corporate or government security policies 520 (e.g., FIPS 140-2). The defined FIPS mode of operation 510 limits the use of cryptographic algorithms by the devices 250 to those that are FIPS-approved (e.g., AES and Triple DES), and when enabled, forces the devices to use only these algorithms.

Figure 8:
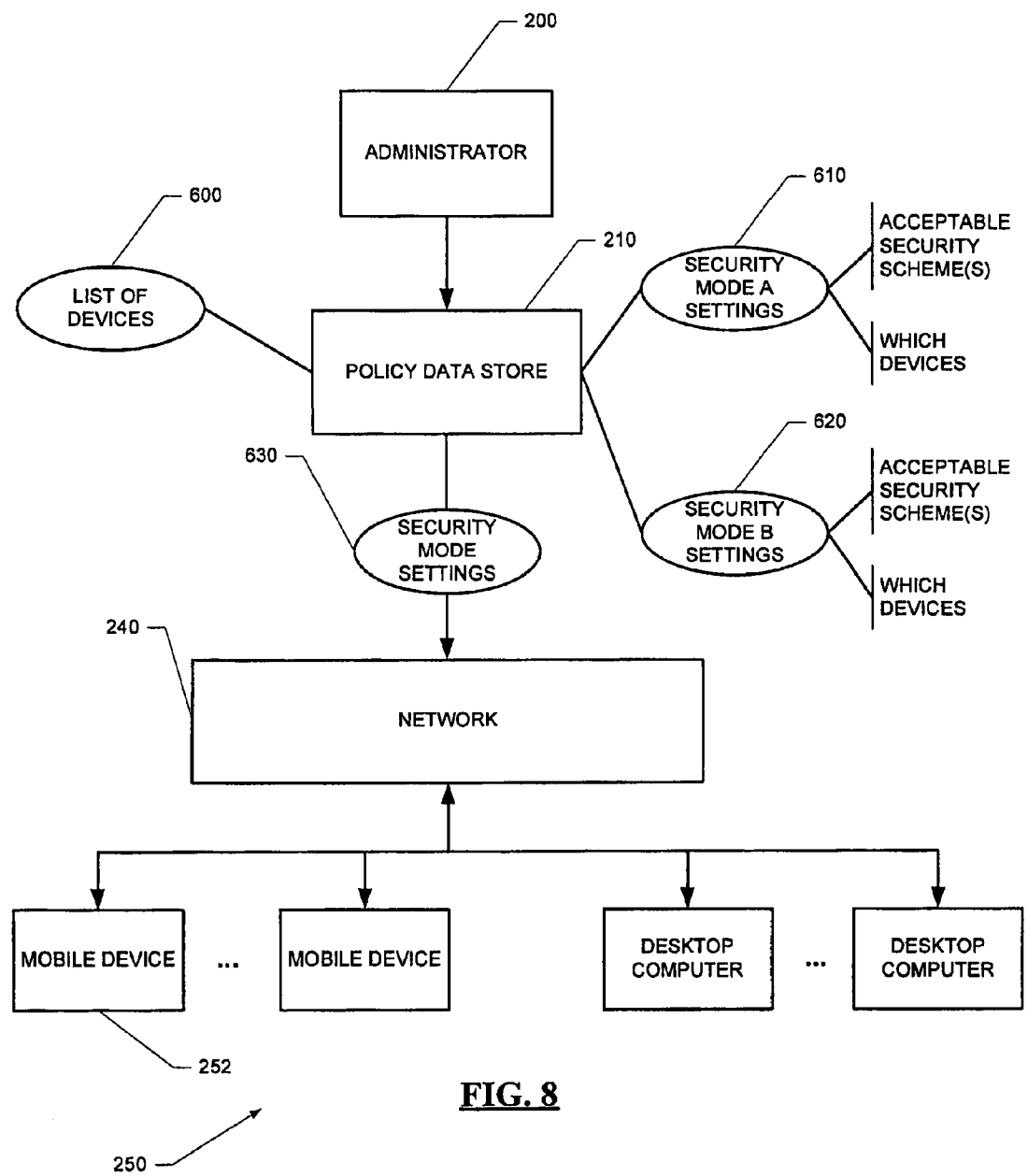
FIGS. 8 and 9 are block diagrams depicting multiple security mode settings being deployed to the devices.
Figure 9:
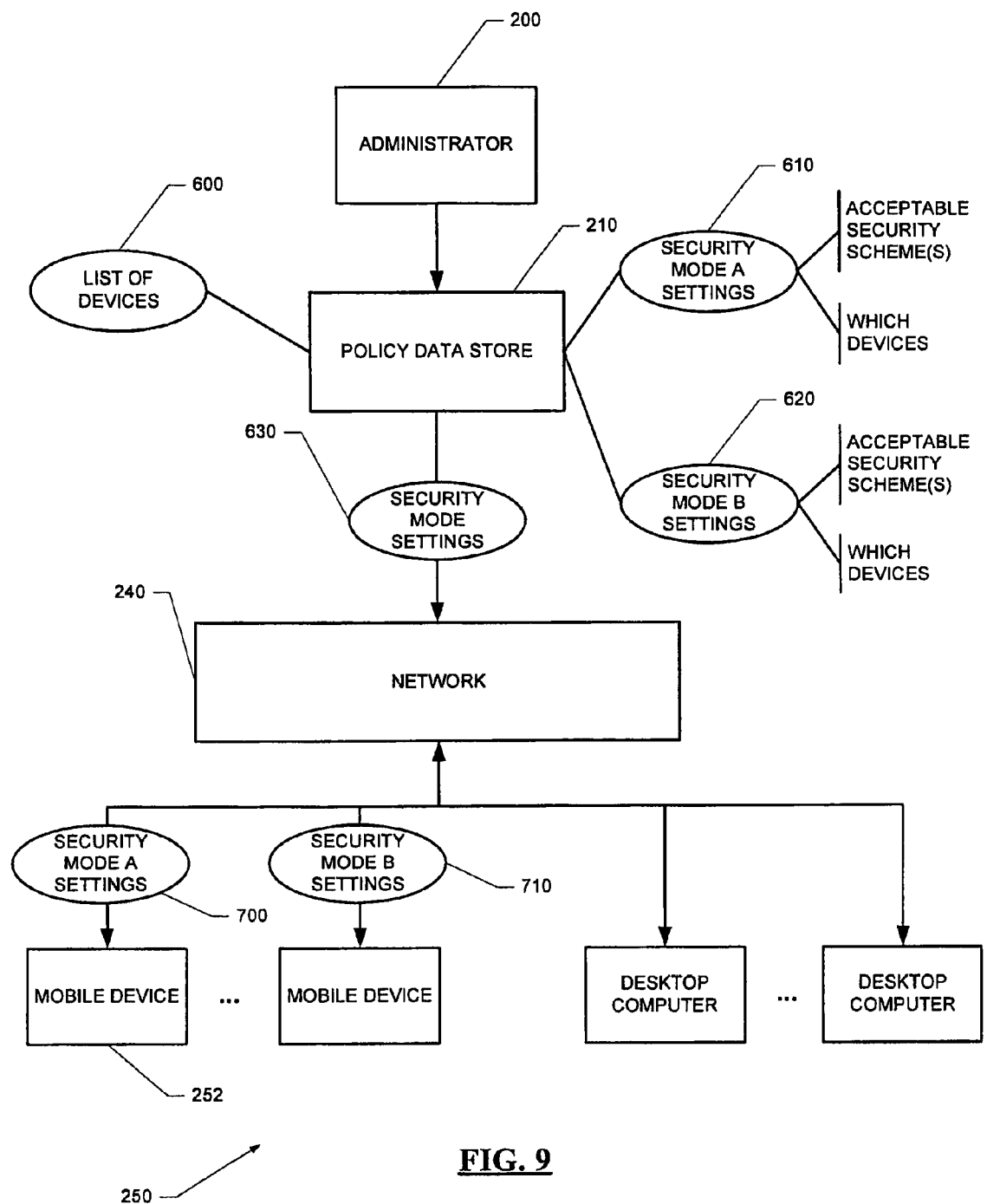

FIG. 8 illustrates that multiple security mode settings 630 can be deployed to the devices 250. The policy data store 210 in this example contains a list 600 of devices as well as which security modes should be used for the devices. The policy data store 210 can contain one or more data structures for indicating which devices should utilize which security schemes. For example, a data structure 610 can be used to store which devices should use security mode A settings, and data structure 620 can be used to store which devices should use security mode B settings. FIG. 9 shows that based upon the information contained in the data structures 610 and 620, different settings (e.g., security settings A 700 and security settings B 710) can be deployed to different devices at the same time or at different times.

Figure 10:
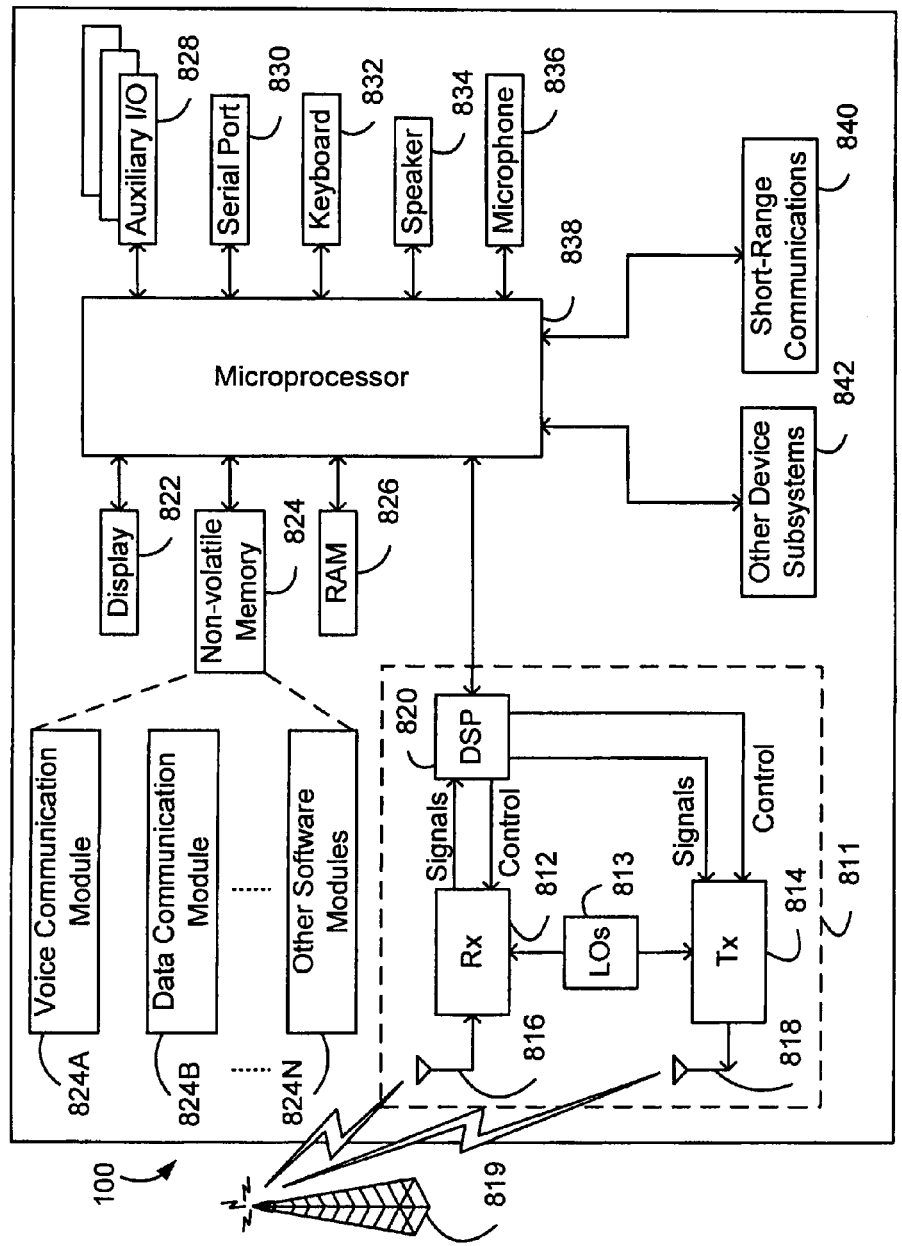
FIG. 10 is a block diagram of an example mobile device.

The systems and methods disclosed herein are presented only by way of example and are not meant to limit the scope of the invention. Other variations of the systems and methods described above will be apparent to those skilled in the art and as such are considered to be within the scope of the invention. For example, the systems and methods disclosed herein may be used with many different computers and devices, such as a wireless mobile communications device shown in FIG. 10. With reference to FIG. 10, the mobile device 100 is a dual-mode mobile device and includes a transceiver 811, a microprocessor 838, a display 822, non-volatile memory 824, random access memory (RAM) 826, one or more auxiliary input/output (I/O) devices 828, a serial port 830, a keyboard 832, a speaker 834, a microphone 836, a short-range wireless communications sub-system 840, and other device sub-systems 842.

The transceiver 811 includes a receiver 812, a transmitter 814, antennas 816 and 818, one or more local oscillators 813, and a digital signal processor (DSP) 820. The antennas 816 and 818 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 10 by the communication tower 819. These voice and data networks may be separate communication networks using separate infrastructure, such as base stations, network controllers, etc., or they may be integrated into a single wireless network.

The transceiver 811 is used to communicate with the network 819, and includes the receiver 812, the transmitter 814, the one or more local oscillators 813 and the DSP 820. The DSP 820 is used to send and receive signals to and from the transceivers 816 and 818, and also provides control information to the receiver 812 and the transmitter 814. If the voice and data communications occur at a single frequency, or closely-spaced sets of frequencies, then a single local oscillator 813 may be used in conjunction with the receiver 812 and the transmitter 814. Alternatively, if different frequencies are utilized for voice communications versus data communications for example, then a plurality of local oscillators 813 can be used to generate a plurality of frequencies corresponding to the voice and data networks 819. Information, which includes both voice and data information, is communicated to and from the transceiver 811 via a link between the DSP 820 and the microprocessor 838.

The detailed design of the transceiver 811, such as frequency band, component selection, power level, etc., will be dependent upon the communication network 819 in which the mobile device 100 is intended to operate. For example, a mobile device 100 intended to operate in a North American market may include a transceiver 811 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 819, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 819, other than any legally required operations, such as '911' emergency calling.

After any required network registration or activation procedures have been completed, the mobile device 100 may the send and receive communication signals, including both voice and data signals, over the networks 819. Signals received by the antenna 816 from the communication network 819 are routed to the receiver 812, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 820. In a similar manner, signals to be transmitted to the network 819 are processed, including modulation and encoding, for example, by the DSP 820 and are then provided to the transmitter 814 for digital to analog conversion, frequency up conversion, filtering, amplification and transmission to the communication network 819 via the antenna 818.

In addition to processing the communication signals, the DSP 820 also provides for transceiver control. For example, the gain levels applied to communication signals in the receiver 812 and the transmitter 814 may be adaptively controlled through automatic gain control algorithms implemented in the DSP 820. Other transceiver control algorithms could also be implemented in the DSP 820 in order to provide more sophisticated control of the transceiver 811.

The microprocessor 838 preferably manages and controls the overall operation of the mobile device 100. Many types of microprocessors or microcontrollers could be used here, or, alternatively, a single DSP 820 could be used to carry out the functions of the microprocessor 838. Low-level communication functions, including at least data and voice communications, are performed through the DSP 820 in the transceiver 811. Other, high-level communication applications, such as a voice communication application 824A, and a data communication application 824B may be stored in the non-volatile memory 824 for execution by the microprocessor 838. For example, the voice communication module 824A may provide a high-level user interface operable to transmit and receive voice calls between the mobile device 100 and a plurality of other voice or dual-mode devices via the network 819. Similarly, the data communication module 824B may provide a high-level user interface operable for sending and receiving data, such as e-mail messages, files, organizer information, short text messages, etc., between the mobile device 100 and a plurality of other data devices via the networks 819.

The microprocessor 838 also interacts with other device subsystems, such as the display 822, the RAM 826, the auxiliary input/output (I/O) subsystems 828, the serial port 830, the keyboard 832, the speaker 834, the microphone 836, the short-range communications subsystem 840 and any other device subsystems generally designated as 842.

Some of the subsystems shown in FIG. 10 perform communication-related functions, whereas other subsystems may provide "resident" or on-device functions. Notably, some subsystems, such as the keyboard 832 and the display 822 may be used for both communication-related functions, such as entering a text message for transmission over a data communication network, and device-resident functions such as a calculator or task list or other PDA type functions.

Operating system software used by the microprocessor 838 is preferably stored in a persistent store such as non-volatile memory 824. The non-volatile memory 824 may be implemented, for example, as a Flash memory component, or as battery backed-up RAM. In addition to the operating system, which controls low-level functions of the mobile device 810, the non-volatile memory 824 includes a plurality of software modules 824A-824N that can be executed by the microprocessor 838 (and/or the DSP 820), including a voice communication module 824A, a data communication module 824B, and a plurality of other operational modules 824N for carrying out a plurality of other functions. These modules are executed by the microprocessor 838 and provide a high-level interface between a user and the mobile device 100. This interface typically includes a graphical component provided through the display 822, and an input/output component provided through the auxiliary I/O 828, keyboard 832, speaker 834, and microphone 836. The operating system, specific device applications or modules, or parts thereof, may be temporarily loaded into a volatile store, such as RAM 826 for faster operation. Moreover, received communication signals may also be temporarily stored to RAM 826, before permanently writing them to a file system located in a persistent store such as the Flash memory 824.

An exemplary application module 824N that may be loaded onto the mobile device 100 is a personal information manager (PIM) application providing PDA functionality, such as calendar events, appointments, and task items. This module 824N may also interact with the voice communication module 824A for managing phone calls, voice mails, etc., and may also interact with the data communication module for managing e-mail communications and other data transmissions. Alternatively, all of the functionality of the voice communication module 824A and the data communication module 824B may be integrated into the PIM module.

The non-volatile memory 824 preferably also provides a file system to facilitate storage of PIM data items on the device. The PIM application preferably includes the ability to send and receive data items, either by itself, or in conjunction with the voice and data communication modules 824A, 824B, via the wireless networks 819. The PIM data items are preferably seamlessly integrated, synchronized and updated, via the wireless networks 819, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 826. Such information may instead be stored in the non-volatile memory 824, for example, when storage intervals are relatively short, such that the information is removed from memory soon after it is stored. However, storage of this information in the RAM 826 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 830 of the mobile device 100 to the serial port of a computer system or device. The serial port 830 may also be used to enable a user to set preferences through an external device or software application, or to download other application modules 824N for installation. This wired download path may be used to load an encryption key onto the device, which is a more secure method than exchanging encryption information via the wireless network 819. Interfaces for other wired download paths may be provided in the mobile device 100, in addition to or instead of the serial port 830. For example, a USB port would provide an interface to a similarly equipped personal computer.

Additional application modules 824N may be loaded onto the mobile device 100 through the networks 819, through an auxiliary I/O subsystem 828, through the serial port 830, through the short-range communications subsystem 840, or through any other suitable subsystem 842, and installed by a user in the non-volatile memory 824 or RAM 826. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 811 and provided to the microprocessor 838, which preferably further processes the received signal in multiple stages as described above, for eventual output to the display 822, or, alternatively, to an auxiliary I/O device 828. A user of mobile device 100 may also compose data items, such as e-mail messages, using the keyboard 832, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 828, which may include a thumbwheel input device, a touchpad, a variety of switches, a rocker input switch, etc. The composed data items input by the user may then be transmitted over the communication networks 819 via the transceiver module 811.

When the mobile device 100 is operating in a voice communication mode, the overall operation of the mobile device is substantially similar to the data mode, except that received signals are preferably be output to the speaker 834 and voice signals for transmission are generated by a microphone 836. Alternative voice or audio I/O subsystems, such as a voice message recording subsystem, may also be implemented on the mobile device 100. Although voice or audio signal output is preferably accomplished primarily through the speaker 834, the display 822 may also be used to provide an indication of the identity of a calling party, the duration of a voice call, or other voice call related information. For example, the microprocessor 838, in conjunction with the voice communication module and the operating system software, may detect the caller identification information of an incoming voice call and display it on the display 822.

A short-range communications subsystem 840 is also included in the mobile device 100. The subsystem 840 may include an infrared device and associated circuits and components, or a short-range RF communication module such as a Bluetooth.™. module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

The invention claimed is:

1. A wireless mobile device configured to communicate with a policy data storage located remotely from the wireless mobile device, the wireless mobile device comprising:
   a processor configured to be placed in a first security mode of operation responsive to the wireless mobile device receiving first instructions from the policy data storage located at a remote location, the first instructions containing a first administrative selection;
   the processor further configured to be placed in a second security mode of operation responsive to the wireless mobile device receiving second instructions from the policy data storage at the remote location, the second instructions containing a second administrative selection, wherein at least one of the first and second security modes of operation are initiated without intervention from a user of the wireless device and causes the processor to use one or more security algorithms corresponding to one or more security schemes stored in the policy data storage at the remote location, and wherein at least one of the first and second security modes of operation force use of at least one cryptographic algorithm selected from the one or more security algorithms; and
   a display configured to visually indicate a current security mode of operation to a user of the wireless mobile device,
   wherein the processor is configured to transmit an indication of the wireless mobile device's current security mode to a remote administrator that selects the first and second administrative selections.

2. The wireless mobile device of claim 1, wherein the display further comprises a security options screen configured to provide the visual indication of the current security mode of operation.

3. The wireless mobile device of claim 1, wherein at least one of the first and second security modes of operation comprises a Federal Information Processing Standard (FIPS) mode of operation that forces the wireless mobile device to use only the at least one cryptographic algorithm.

4. The wireless mobile device of claim 1, wherein at least one of the first and second security modes of operation includes forcing the wireless mobile device to use Advanced Encryption Standard (AES) or Triple Data Encryption Standard (3DES).

5. The wireless mobile device of claim 1, wherein the wireless mobile device is forced to use at least one of Advanced Encryption Standard (AES) or Triple Data Encryption Standard (3DES) when the current security mode is a Federal Information Processing Standard (FIPS) mode of operation.

6. A method for operating a wireless mobile device configured to communicate with a policy data storage located remotely from the wireless mobile device, the method comprising:
   placing a processor in a first security mode of operation responsive to the wireless mobile device receiving first instructions from the policy data storage located at a remote location, the first instructions containing a first administrative selection;
   placing the processor in a second security mode of operation responsive to the wireless mobile device receiving second instructions from the policy data storage at the remote location, the second instructions containing a second administrative selection, wherein at least one of the first and second security modes of operation are initiated without intervention from a user of the wireless device and causes the processor to use one or more security algorithms corresponding to one or more security schemes stored in the policy data storage at the remote location, and wherein at least one of the first and second security modes of operation force use of at least one cryptographic algorithm selected from the one or more security algorithms;
   visually indicating a current security mode of operation to a user of the wireless mobile device using a display of the wireless mobile device; and
   transmitting an indication of the wireless mobile device's current security mode to a remote administrator that selects the first and second administrative selections.

7. The method of claim 6, further comprising, wherein the display further comprises a security options screen configured to provide the visual indication of the current security mode of operation.

8. The method of claim 6, wherein at least one of the first and second security modes of operation comprises a Federal Information Processing Standard (FIPS) mode of operation that force the wireless mobile device to use only the at least one cryptographic algorithm.

9. The method of claim 6, wherein at least one of the first and second security modes of operation includes forcing the wireless mobile device to use Advanced Encryption Standard (AES) or Triple Data Encryption Standard (3DES).

10. The method of claim 6, wherein the wireless mobile device is forced to use at least one of the Triple Data Encryption Standard (3DES) or Advanced Encryption Standard (AES) when the current security mode is a Federal Information Processing Standard (FIPS) mode of operation.

11. A non-transitory computer readable storage medium having computer readable instructions stored thereon that, when executed, implement method for operating a wireless mobile device configured to communicate with a policy data storage located remotely from the wireless mobile device, the method comprising:
   placing a processor in a first security mode of operation responsive to the wireless mobile device receiving first instructions from the policy data storage at a remote location, the first instructions containing a first administrative selection;
   placing the processor in a second security mode of operation responsive to the wireless mobile device receiving second instructions from the policy data storage at the remote location, the second instructions containing a second administrative selection, wherein at least one of the first and second security modes of operation are initiated without intervention from a user of the wireless device and causes the processor to use one or more security algorithms corresponding to one or more security schemes stored in the policy data storage at the remote location, and wherein at least one of the first and second security modes of operation force use of at least one cryptographic algorithm selected from the one or more security algorithms;

visually indicating a current security mode of operation to a user of the wireless mobile device using a display of the wireless mobile device; and transmitting an indication of the wireless mobile device's current security mode to a remote administrator that selects the first and second administrative selections.

12. The computer readable storage medium of claim 11, wherein the display further comprises a security options screen configured to provide the visual indication of the current security mode of operation.

13. The computer readable storage medium of claim 11, wherein at least one of the first and second security modes of operation comprises a Federal Information Processing Standard (FIPS) mode of operation that forces the wireless mobile device to use only the at least one cryptographic algorithm.

14. The computer readable storage medium of claim 11, wherein at least one of the first and second security modes of operation includes forcing the wireless mobile device to use Advanced Encryption Standard (AES) or Triple Data Encryption Standard (3DES).

15. The computer readable storage medium of claim 11, wherein the wireless mobile device is forced to use at least one of Triple Data Encryption Standard (3DES) or Advanced Encryption Standard (AES) when the current security mode is a Federal Information Processing Standard (FIPS) mode of operation.

16. A system, comprising:

at least one wireless mobile device operable by a user;

a host circuit in communication with the at least one wireless mobile device and located remotely from the at least one wireless mobile device, the host system including a policy data storage and configured to place the at least one wireless mobile device in a first security mode of operation responsive to receiving first instructions containing a first administrative selection, the policy data storage location configured to store at least one security mode setting including at least one security scheme corresponding to a particular wireless mobile device among the at least one wireless mobile device;

the host circuit configured to select the security mode from the policy data storage and place the at least one wireless mobile device in a second security mode of operation that executes the corresponding at least one security scheme responsive to receiving second instructions containing a first administrative selection, wherein at least one of the first and second security modes of operation are initiated without intervention from the user of the at least one wireless mobile device and causes the processor to use one or more security algorithms corresponding to the at least one security scheme stored in the policy data storage, and wherein at least one of the first and second security modes of operation force use of at least one cryptographic algorithm selected from the one or more security algorithms; and the at least one wireless mobile device having a display configured to visually indicate a current security mode of operation to a user of the wireless mobile device, wherein the host device is configured to receive an indication of the current security mode from the at least one wireless mobile device.

17. The system of claim 16, wherein the display further comprises a security options display screen configured to provide the visual indication of the current security mode of operation.

18. The system of claim 16, wherein at least one of the first and second security modes of operation comprises a Federal Information Processing Standard (FIPS) mode of operation that forces the at least one wireless mobile device to use only the at least one cryptographic algorithm.

19. The system of claim 16, wherein at least one of the first and second security modes of operation includes forcing the at least one wireless mobile device to use Advanced Encryption Standard (AES) or Triple Data Encryption Standard (3DES).

20. The system of claim 16, wherein the at least one wireless mobile device is forced to use Triple Data Encryption Standard (3DES) or Advanced Encryption Standard (AES) when the current security mode is a Federal Information Processing Standard (FIPS) mode of operation.

* * * * *